(12) United States Patent
Stewart et al.

(10) Patent No.: US 10,023,214 B2
(45) Date of Patent: Jul. 17, 2018

(54) DEVICE FOR MOVING A LOAD

(71) Applicant: 2S Innovations, Inc., Cary, NC (US)

(72) Inventors: George Stewart, Wilson, NC (US); Ty Hagler, Durham, NC (US)

(73) Assignee: 2S Innovations, Inc., Cary, NC (US)

(*) Notice: Subject to any disclaimer, the term of this patent is extended or adjusted under 35 U.S.C. 154(b) by 0 days.

(21) Appl. No.: 15/620,711

(22) Filed: Jun. 12, 2017

(65) Prior Publication Data

US 2017/0355389 A1 Dec. 14, 2017

Related U.S. Application Data

(60) Provisional application No. 62/349,002, filed on Jun. 12, 2016.

(51) Int. Cl.
*B62B 5/00* (2006.01)
*B62B 3/04* (2006.01)
*B65G 67/04* (2006.01)
*B62B 3/02* (2006.01)
*B60P 1/64* (2006.01)
*B62B 5/06* (2006.01)

(52) U.S. Cl.
CPC .......... *B62B 5/0003* (2013.01); *B60P 1/6427* (2013.01); *B62B 3/022* (2013.01); *B62B 3/04* (2013.01); *B62B 5/00* (2013.01); *B65G 67/04* (2013.01); *B62B 5/067* (2013.01)

(58) Field of Classification Search
CPC .......... B62B 3/00; B62B 5/0003; B62B 3/02; B62B 3/022; B62B 3/04; B62B 5/00; B65G 67/04; B60P 1/6427; B25H 1/04
See application file for complete search history.

(56) References Cited

U.S. PATENT DOCUMENTS

| 4,288,195 A | 9/1981 | Brewer |
| 4,921,295 A | 5/1990 | Stollenwerk |
| 5,090,335 A * | 2/1992 | Russell .................. B60P 1/433 108/44 |
| 5,346,355 A | 9/1994 | Riemer |
| 6,531,319 B1 | 3/2003 | Pant et al. |
| 6,976,696 B2 | 12/2005 | O'Krangley |
| 8,075,016 B2 | 12/2011 | Silberberg |
| 8,714,612 B2 | 5/2014 | Chinn |
| 8,979,115 B1 * | 3/2015 | Baron .................... B62B 3/027 280/43 |
| 9,849,582 B2 * | 12/2017 | Cheff ....................... B25H 1/04 |
| 2008/0093827 A1 | 4/2008 | Silberberg |
| 2010/0320732 A1 * | 12/2010 | Dobrachinski ......... B62B 3/027 280/651 |

(Continued)

*Primary Examiner* — Brian L Swenson
(74) *Attorney, Agent, or Firm* — NK Patent Law, PLLC

(57) ABSTRACT

A device for moving a load is provided. The device includes a platform defining a surface and an edge extending downward therefrom. The device further includes two pairs of opposing legs each defining a top portion pivotally engaged with the platform interior of the edge, wherein each pair of legs has an extended position where each leg extends away from the edge. Each pair of legs further includes a collapsed position where the top portion of each leg extends substantially parallel and interior to the edge, a middle portion of each leg extends through a corresponding slot defined by the edge, and a bottom portion of each leg extends substantially parallel and exterior to the edge.

19 Claims, 8 Drawing Sheets

(56) References Cited

U.S. PATENT DOCUMENTS

| | | | |
|---|---|---|---|
| 2012/0193894 A1* | 8/2012 | Fine | B62B 3/027 |
| | | | 280/651 |
| 2014/0140797 A1* | 5/2014 | Howe | B62B 3/027 |
| | | | 414/498 |
| 2014/0369801 A1* | 12/2014 | Beauchamp | B62B 5/0003 |
| | | | 414/800 |
| 2017/0166229 A1* | 6/2017 | Camarco | B62B 3/022 |
| 2017/0181537 A1* | 6/2017 | Chang | A47B 3/0912 |
| 2018/0009461 A1* | 1/2018 | Rucker | B62B 5/0003 |

* cited by examiner

DEVICE FOR MOVING A LOAD

CROSS REFERENCE TO RELATED APPLICATIONS

This application is a non-provisional of U.S. Provisional Patent Application 62/349,002 filed Jun. 12, 2016, the contents each of which are hereby incorporated by reference in their entirety.

TECHNICAL FIELD

The presently disclosed subject matter is directed towards a device for move a load. Specifically, the device moves a load from a first location to a second location for loading and offloading the load from the bed of a vehicle or a raised platform.

BACKGROUND

Transferring a load from a first location to a second location becomes increasingly difficult when the heights of the two locations are substantially different or when the load is heavy. Loading and offloading a load to and from a bed of a truck or a raised platform requires substantial effort and can be dangerous. Prior art devices for transferring loads between locations include ambulance stretchers and scissor lifts. Scissor lifts are excellent devices for moving loads in vertical directions but typically do not allow for the load to be transported onto a platform or bed without offloading the load from the lift. Ambulance stretchers, and other medical transports, do provide the ability to load and offload a person from a bed or platform at differing locations, but fail when the load is much heavier or has an extensive volume, due to the tendency of the stretcher to tip over.

Accordingly, there remains a need for a device that addresses the various disadvantages associated with previous loading devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment of the disclosed subject matter, a device for moving a load is provided. The device includes a platform defining a surface and an edge extending downward therefrom. The devices further includes two pairs of opposing legs each defining a top portion pivotally engaged with the platform interior of the edge, wherein each pair of legs has an extended position where each leg extends away from the edge. Further, each pair of legs has a collapsed position where the top portion of each leg extends substantially parallel and interior to the edge, a middle portion of each leg extends through a corresponding slot defined by the edge, and a bottom portion of each leg extends substantially parallel and exterior to the edge.

According to at least another embodiment of the disclosed subject matter, the device further includes a lever corresponding to each leg. The lever defines a long end pivotally engaged to the top portion of the leg and a short end pivotally engaged to a support corresponding to each of the legs. The supports pivotally engaged to the platform interior of the edge.

According to at least another embodiment of the disclosed subject matter, the device further includes a lock corresponding to each pair of legs. The locks define two lock housings slidingly coupled with each of two of the supports, and a lock bar extending between the two lock housings, wherein each of the two lock housings are configured to receive the short end of the lever when the pair of legs is in an extended position for locking the lever into a locked position.

According to at least another embodiment of the disclosed subject matter, the device of claim further includes a bridge extending between the bottom portions of each of the pair of legs.

According to at least another embodiment of the disclosed subject matter, the edge further defines a pair of grooves for accepting the bridge when the pair of legs is in the collapsed position.

According to at least another embodiment of the disclosed subject matter, the device further includes a wheel engaged to a bottom portion of each of the legs for translating the device when the pair of legs is in the collapsed or the extended position.

According to at least another embodiment of the disclosed subject matter, the device further includes a handle engaged with the platform for maneuvering the device.

According to at least another embodiment of the disclosed subject matter, the device further includes a removable panel defined by the surface of the platform, and a storage cavity defining an open side coverable by the removable panel.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

DETAILED DESCRIPTION

Figure 1:
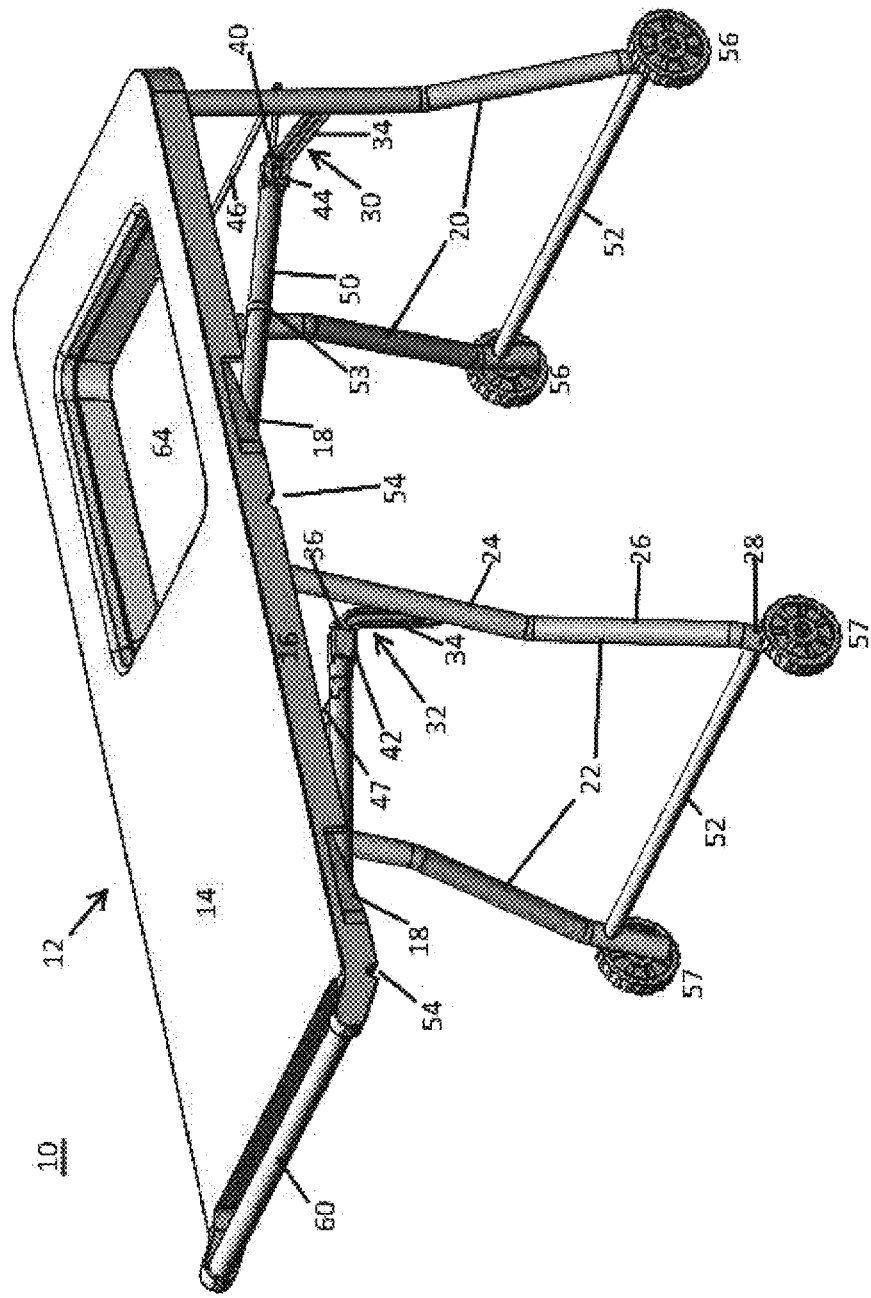
FIG. 1 is a perspective view of the device in an extended position according to one or more embodiments of the presently disclosed subject matter.
Figure 2:
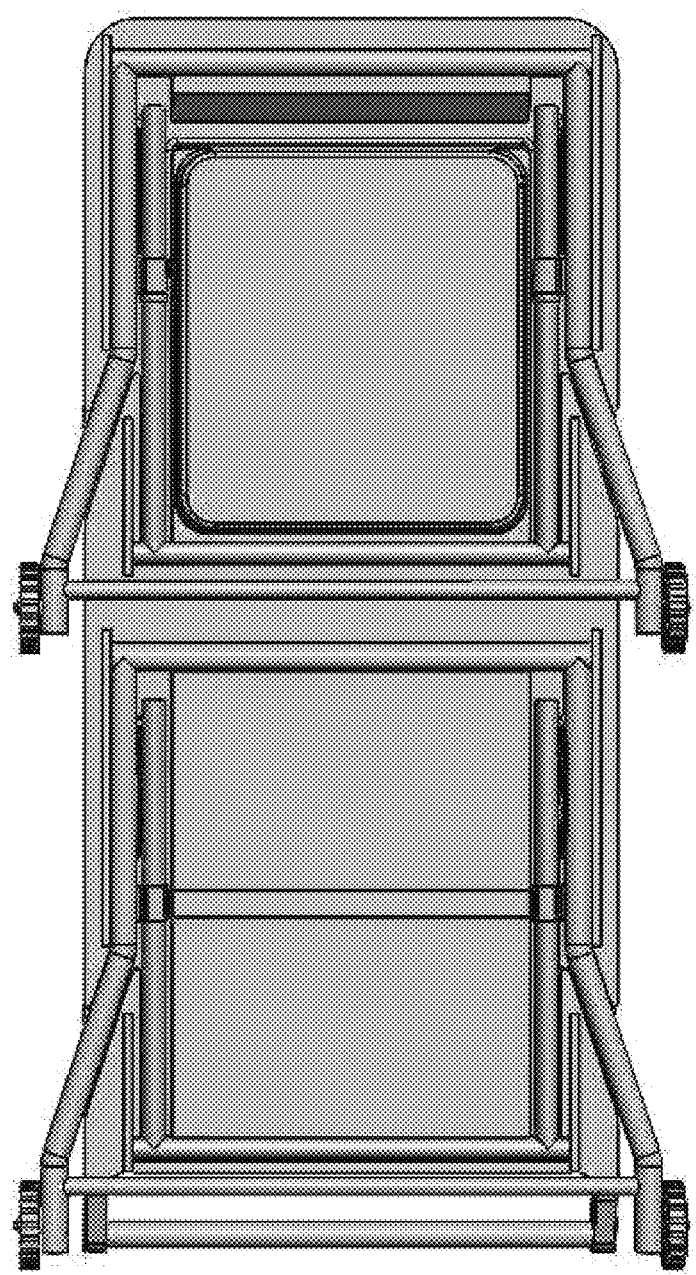
FIG. 2 is a bottom view of the device in a collapsed position according to one or more embodiments of the presently disclosed subject matter.
Figure 3:
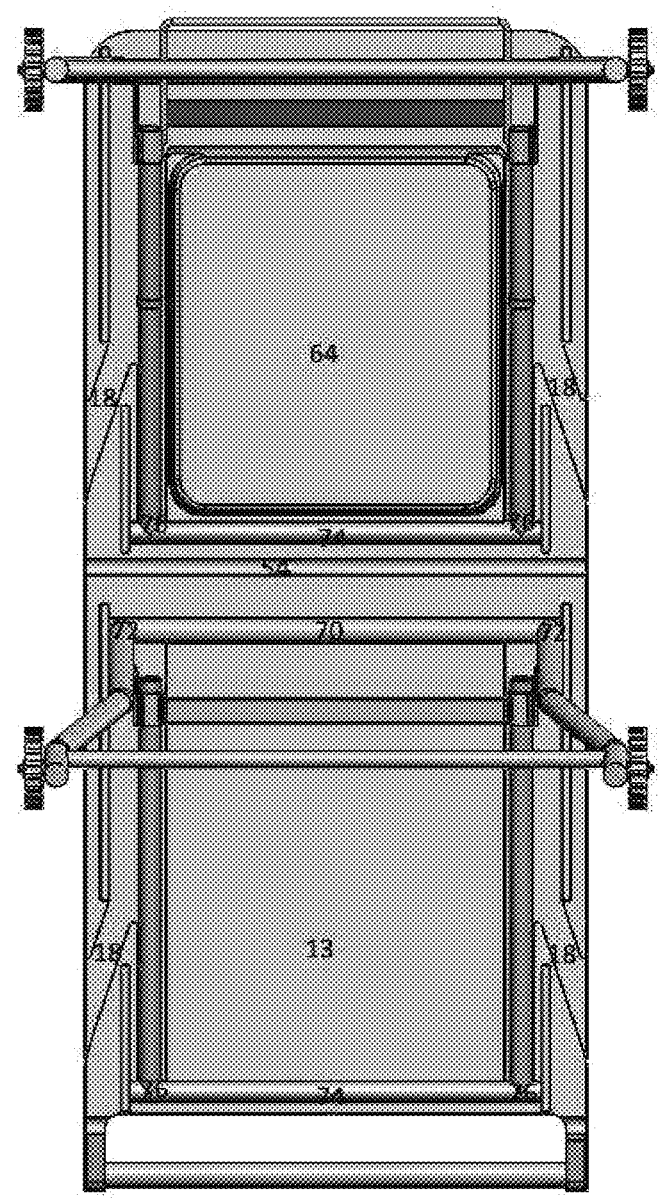
FIG. 3 is a bottom view of the device in an extended position according to one or more embodiments of the presently disclosed subject matter.
Figure 4:
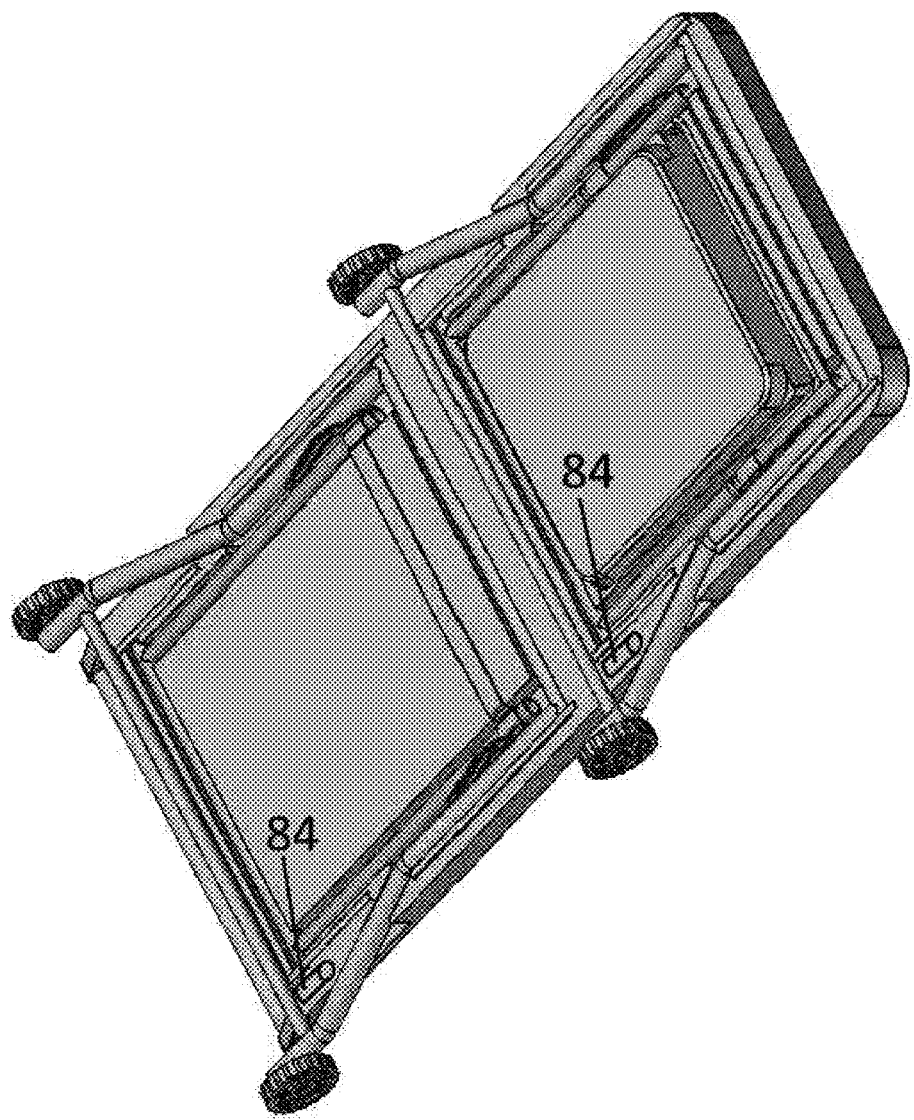
FIG. 4 is a bottom perspective view of the device in a collapsed position according to one or more embodiments of the presently disclosed subject matter.
Figure 5:
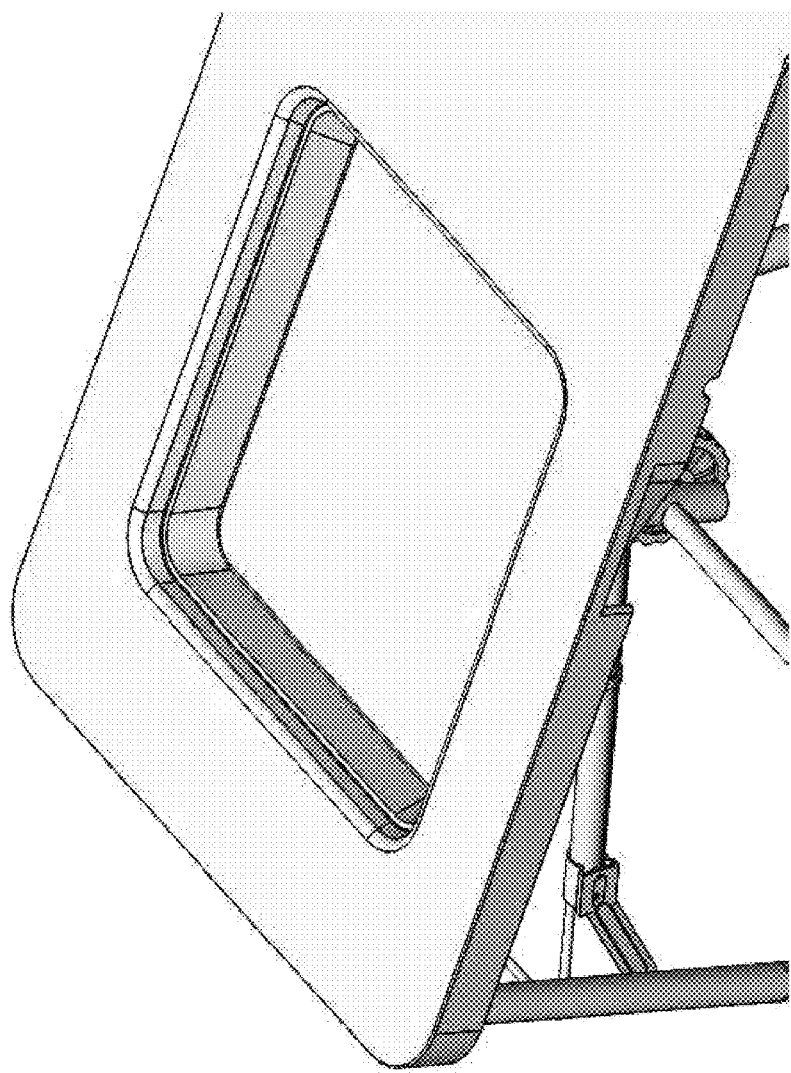
FIG. 5 is a perspective view of the storage cavity according to one or more embodiments of the presently disclosed subject matter.
Figure 6:
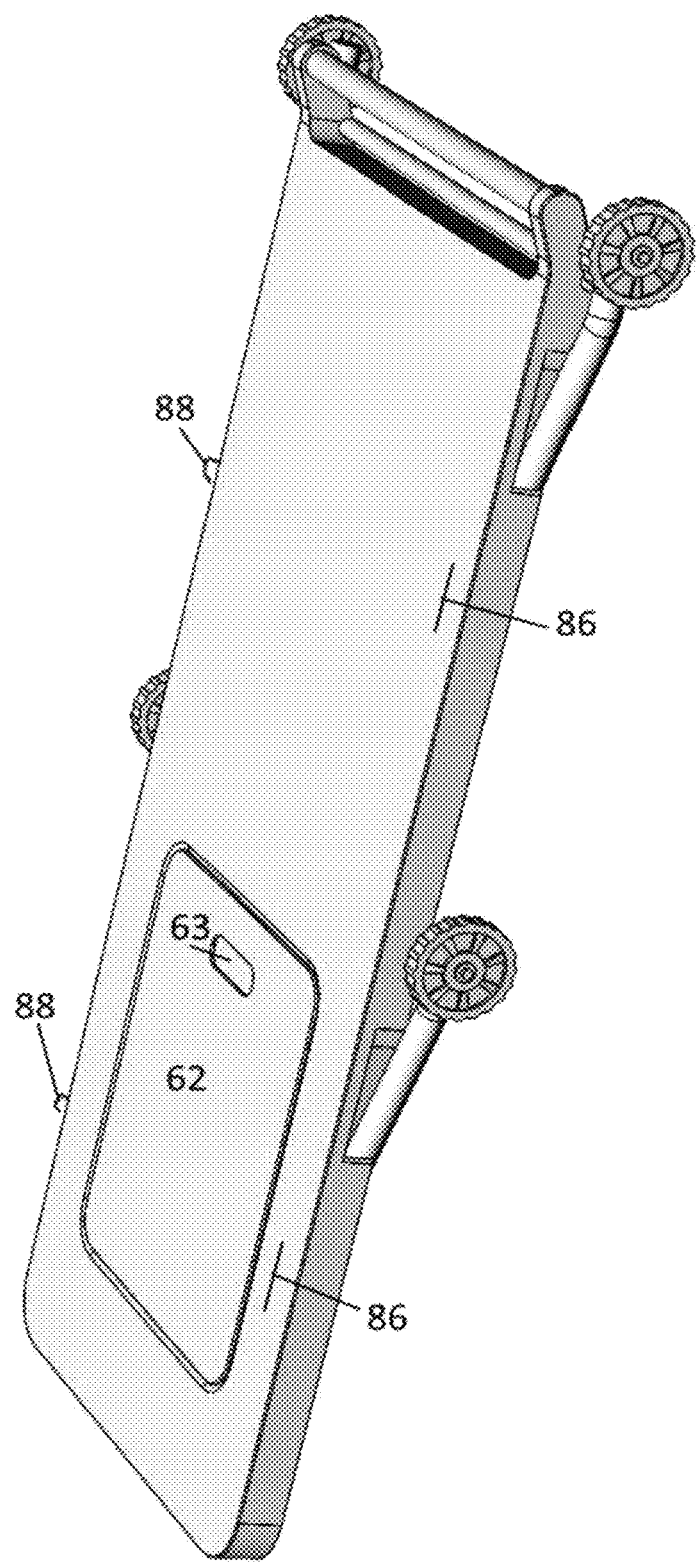
FIG. 6 is a top perspective view of the device in a collapsed position according to one or more embodiments of the presently disclosed subject matter.
Figure 7:
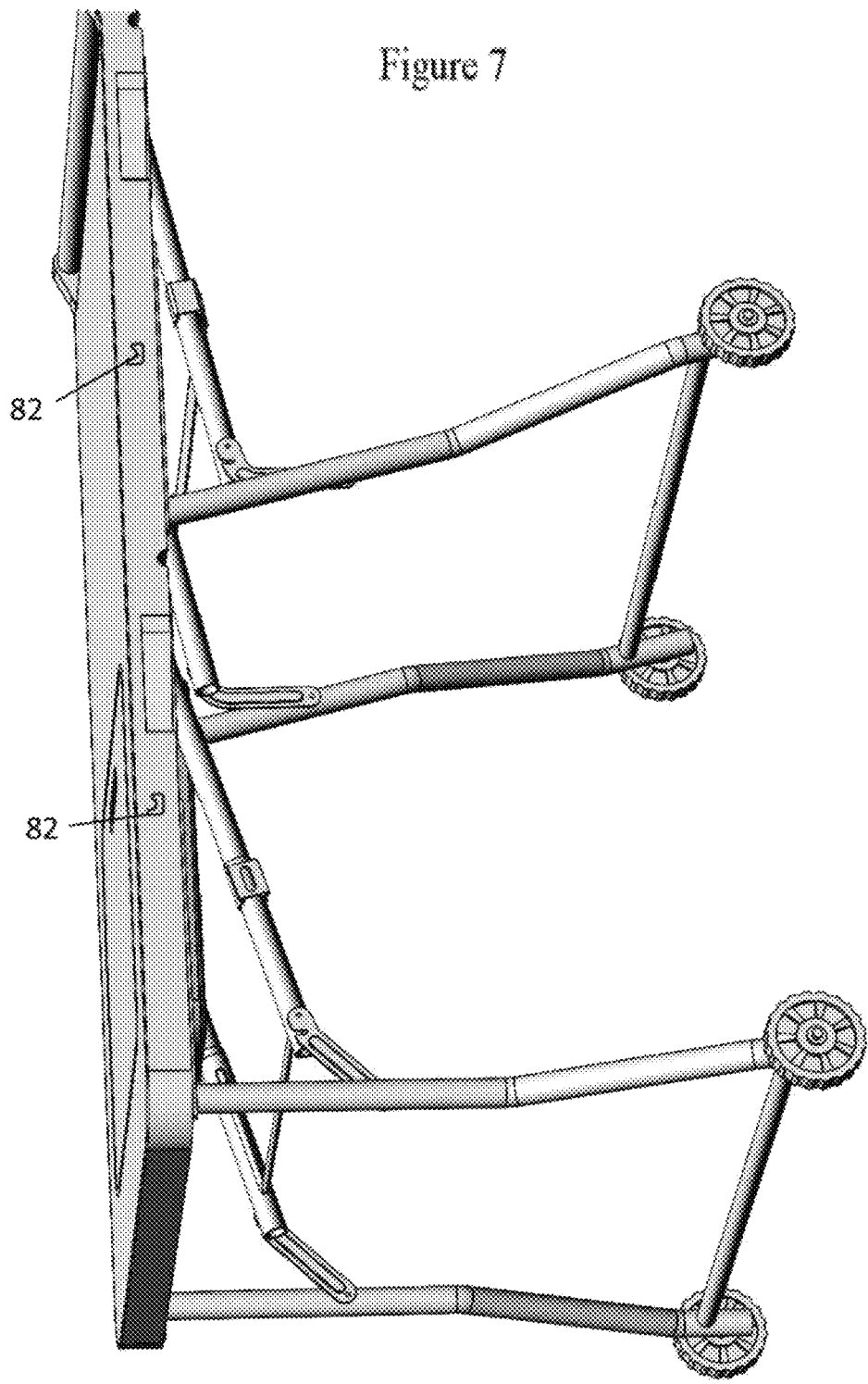
FIG. 7 is a side perspective view of the device in an extended position according to one or more embodiments of the presently disclosed subject matter.
Figure 8:
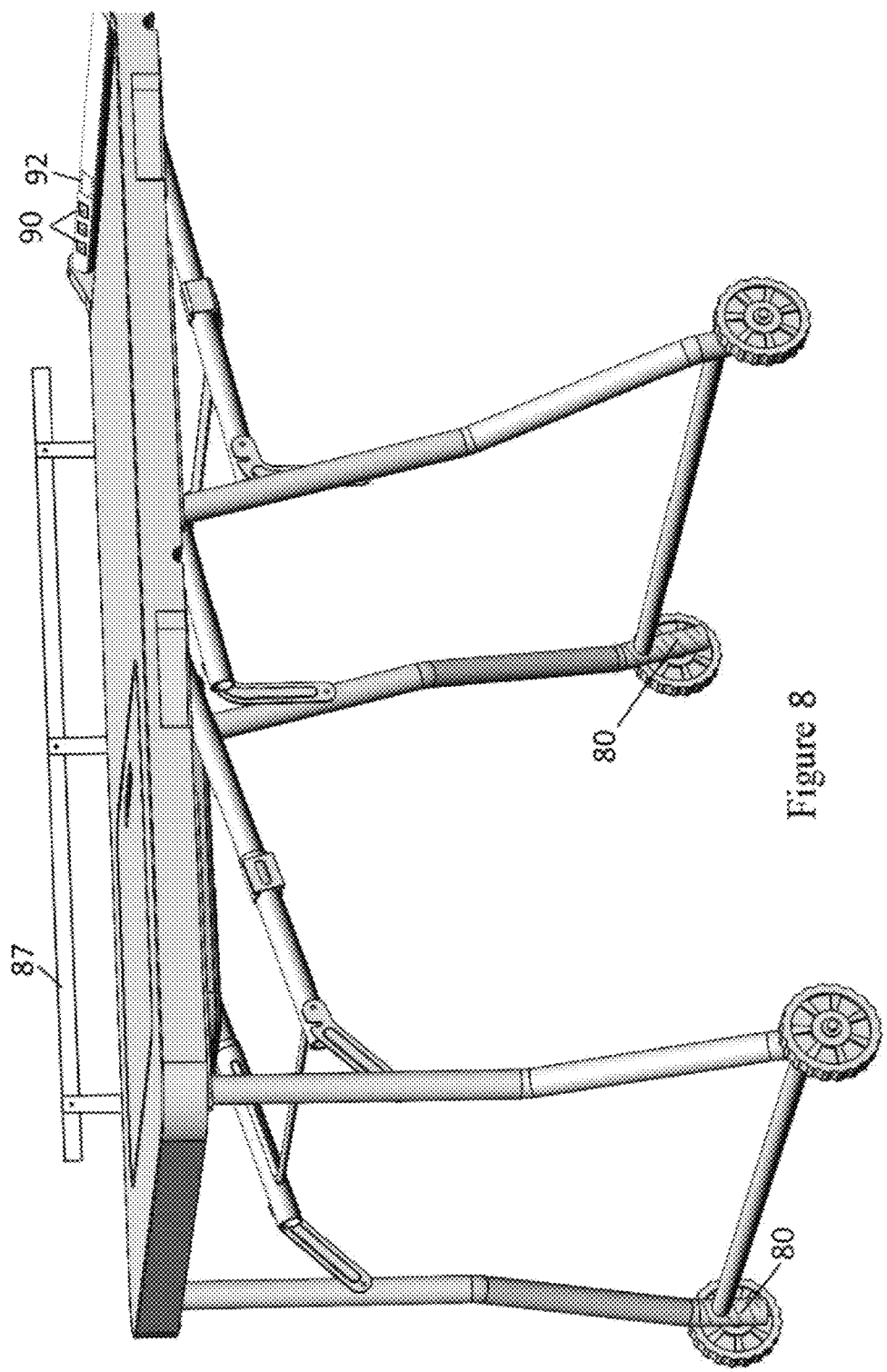
FIG. 8 is a side perspective view of the device having rails according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

As shown in FIG. 1, a device 10 for moving a load 1 is provided according to one or more embodiments. The device 10 may include a platform 12 and two pairs of opposing legs pivotally engaged thereto. The device 10 may further include a handle 60. The two pairs of opposing legs may include a pair of front legs 20 positioned distal the handle 60 and a pair of rear legs 22 positioned proximal the handle 60. The handle 60 may be coupled to, or engaged with, the platform 12 for maneuvering the device 10. In other embodiments, the handle 60 may be defined by the platform 12. The handle 60 may be translatable with respect to the platform 12 and the device 10 may include a locking mechanism for locking the handle 60 into position with respect to the platform 12. The handle 60 may include one or more electrical ports 90 for providing electricity or transferring data. For example, but not limited thereto, each electrical port may be a USB slot, a two-pronged slot, three-pronged slot, HDMI slot, video card slot, headphone jack and/or any other electrical receptacle capable of transferring electricity and/or data. The handle 60 may further include a surge protector 92 engaged with the electrical port 90.

The platform 12 may define a surface 14, which may be substantially flat or may be shaped to conform to a specific load 1 or type of load 1. For example, the surface 14 may have arcuate portions for receiving a curved area of a load 1. Further, the platform 12 may define an edge 16 extending from all of, or a portion of, the outermost boundaries of the surface 14. The edge 16 may extend downward from the surface 14 (e.g., towards the Earth or the ground on which the device 10 is resting). In some embodiments, the downward extension may form a substantially perpendicular or non-acute angle between the surface 14 and the edge 16.

In some embodiments, each leg of the two pairs of opposing legs 20, 22 may define a top portion 24, a middle portion 26 and/or a bottom portion 28. The top portion 24 may be pivotally engaged with an underside 13 of the platform 12 and may be interior of the edge 16. The top portion 24 may be engaged with the platform 12 using any number of fasteners. In one embodiment, a leg pivot bar 70 extends between the top portions 24 of each leg of a pair of opposing legs 20, 22. The leg pivot bar 70 may accept an end of the top portions 24 in a leg receptacle 72 defined by the leg pivot bar 70. The leg pivot bar 70 may be rotationally engaged with an underside 13 of the platform 12. The top portion 24 is the portion positioned closest to the leg's rotational engagement with the platform 12, and the bottom portion 28 is positioned most distal from the leg's rotational engagement with the platform 12; the middle portion 26 is positioned between the top portion 24 and the bottom portion 28.

Each pair of legs 20, 22 may have an extended position P1 and a collapsed position P2. In the extended position P1, a pair of legs (or both) 20, 22 extends away from the underside 13 of the platform 12 and the edge 16. In a collapsed position P2, a pair of legs (or both) 20, 22 may extend substantially parallel to the underside 13 of the platform 12 and the edge 16. In the collapsed position P2, the top portion 24 of each leg of the pair 20, 22 may extend the substantially parallel and interior to the edge 16, the middle portion 26 may extend through a corresponding slot 18 defined by the edge 16, and the bottom portion 28 may extend substantially parallel and exterior to the edge 16. In some embodiments, the portions 24, 26, 28 of any leg of the pairs of legs 20, 22 may extend from each other at an angle or may be arcuately coupled to each other.

In some embodiments, the top portion 24, middle portion 26 and/or bottom portion 28 may be translatable with respect to each other. For example, but not limited thereto, the bottom portion 28 may be translatable within the middle portion 26. Pins or fasteners may be included to lock the portions 24, 26, 28 into position relative to another portion 24, 26, 28. For example, but not limited thereto, a middle portion 26 may be translatable within a top portion 28, and may be translated to adjust the height of part of the platform 12; the pin or fastener may be manipulated to lock the middle portion 26 into position relative to the top portion 28.

The device 10 for carrying a load may further include a pair of front levers 30 corresponding to the pair of front legs 20. Further, the device may include a pair of rear levers 32 corresponding to the pair of rear legs 22. Each lever of the pair of levers 30, 32 may define a long end 34 pivotally engaged to the top portion 24 of a leg, 20, 22 and a short end 36 pivotally engaged to a support 50, 51. A pair of front supports 50 may be pivotally engaged with a pair of front levers 30 on one end and pivotally engaged to the underside 13 of the platform 12 interior of the edge 16 on another end. Similarly, a pair of rear supports 51 may be pivotally engaged with a pair of rear levers 32 on one end and pivotally engaged to the underside 13 of the platform 12 interior of the edge 16 on another end. The supports 50, 51 may be engaged with the platform 12 using any number of fasteners. In one embodiment, a support pivot bar 70 extends between the supports 50, 51 of each leg of a pair of opposing legs 20, 22, the support pivot bar 70 accepting an end of the supports 50, 51 in a support receptacle 72 defined by the support pivot bar 70. The support pivot bar 70 may be rotationally engaged with an underside 13 of the platform 12.

In some embodiments, the device 10 may further include a lock 40, 42 corresponding to each pair of legs 20, 22 (or pair of levers 30, 32 or pair of supports 50, 51) of the device 10 for locking the pair of legs 20, 22 into an extended position P1. A front lock 40 may correspond to the front pair of legs 20 and a rear lock 42 may correspond to the rear pair of legs 22. The locks 40, 42 may each define two lock housings 44 slidingly coupled with each corresponding support 50, 51. The lock housings 44 may be configured to receive the short end 36 of the lever 30, 32 when the pair of legs 20, 22 is in an extended position P1 for locking the lever 30, 32 into a locked position P3. The lock housing 44 may be substantially cylindrically shaped for sliding about a cylindrical support 50, 51 with the cylindrical shape including lips extending from a side of the housing and forming a rectangular shape for receiving the short end 36 of the lever.

In some embodiments, a lock bar 46, 47 may extend between the two lock housings 44. The rear lock bar 48 extending between the lock housings 44 of the rear lock 42 may be positioned as a straight line between the two lock housings 44. The front lock bar 46 extending between the lock housings 44 of the front lock 40 may be a straight line, U-shaped, or another shape. At least one embodiment of the device 10 includes a removable panel 62 engaged with the surface 14 of the platform 12. The panel 62 may include a grip 63, in the form of a divot, band or other feature for maneuvering the panel 62 by hand, thereon for removing and inserting the panel 62 from the surface 14 of the platform 12. The surface 14 may define a storage cavity 64 defining an open side. The removable panel 62 may be shaped to cover the open side of the storage cavity 64. In some embodiments, where the device 10 includes a storage cavity 64 defined by the surface 14, the front lock bar 44 may be shaped to trace the exterior of the cavity 64. For example, referring to FIG. 1, the front lock bar 44 may be U-shaped, so that the front lock bar 44 may rest about the exterior of the cavity 64 when the front lock 40 is in an unlocked position P4 and the front legs 20 are in a collapsed position P2.

According to another embodiment, the device 10 may further include a bridge 52 extending between the legs of each of the pair of legs 20, 22. For example, the bridge may extend between the bottom portions 28 of the legs 20, 22 for supporting the position of the legs 20, 22 when under stress. As the legs 20, 22 may extend outward from the platform 12—through the slots 18 when in the collapsed position P2—the bridge 52 between the legs of a pair 20, 22 prevents the legs 20, 22 from spreading further apart when in the extended position P1 and when the platform 12 is supporting a load 1. Notably, by having the legs 20, 22 extend outward from each other when in the extended position P1, the platform 12 is capable of carrying larger and heavier loads 1 by granting the platform 12 a more stable base to maneuver. For example, the platform 12 is less likely to tip over and therefore able to manage winds, load shifts, and other factors which may cause the platform to lean one way or the other during transport, loading and offloading.

The edge 16 of the platform 12 may further define a pair of grooves 54 for accepting the bridge 52 when the pair of legs 20, 22 is in the collapsed position P2. Notwithstanding the grooves 54, the bridge 52 of some embodiments may interfere with the ability of the legs 20, 22 to be placed in a fully collapsed position P2.

The device 10 may further include a wheel 56 engaged to a bottom portion 28 of each of the legs 20, 22 for translating the device 10 when both pair of legs 20, 22 is in the collapsed P2 and/or the extended position P1. When the legs 20, 22 are permitted to extend through the slots 18 of the edge, outward from the platform 12, the wheels 56 may be positioned outside of the platform 12 as well. By positioning the wheels 56 outside the platform 12, the height of the platform 12 is at its most compact. Further, the wheels 56 are able to freely rotate without interference from the underside of the platform 12 or by the storage cavity(ies) 64. A shock or spring 80 may be engaged with one or more of the wheels 56 for shock absorption. For example, when the device 10 is translated over uneven grounds, shocks or springs 80 may be positioned above and engaged with each wheel 56 or a pair of wheels 56 for permitting an easier translation.

In at least one mode of operation, the device 10 is provided with the legs 20, 22 each in an extended position P1 and the locks 40, 42 each in a locked position P3. The platform 12 of the device 10 may be carrying a large load 1 which needs to be loaded onto the bed of a truck for transport. In such a scenario, the device 10 carrying the load 1 may be pushed using the handle 60 towards the bed of the truck. The wheels 56 may rotate and additionally may be rotatable about the legs 20, 22 so as to permit the device 10 to be moveable in a linear or curved fashion. The device 10 may be maneuvered and positioned in order to position the front legs 20 of the device 10 closest to the bed of the truck, which is elevated at a height taller than the ground on which the device 10 is being transported.

Upon approaching the bed of the truck, the front lock bar 46 may be translated up the front support bar 50, towards the underside 13 of the platform 12, for placing the front lock 40 in an unlocked position P4 by translating the lock housing 44 off of the short end 36 of the front lever 30. The front lock bar 46 may be translated manually, by grabbing the bar 46 and pulling or pushing the bar 46 up the support 50 towards the platform 12. Alternatively, the front lock bar 46 may be translated by pushing the device 10 towards the bed of the truck such that the truck or truck bed engages the front lock bar 46, thereby causing the front lock bar 46 to be pushed up the support 50 towards the platform 12. In yet another embodiment, a front pull bar or wire may extend from a position near the handle 60 to the front lock bar 46 and may be pulled, thereby pulling the front lock bar 46 up the support 50 towards the platform 12. In some embodiments, the front supports 50 may include a stop member 53 defined on the outer area of the front support 50 for engaging the front lock bar 46 during translation up the support 50 and for stopping any further translation up the support 50. By stopping the translation of the front lock bar 46, the stop member 53 ensures that a U-shaped front lock bar 46, for example, is positioned about the storage cavity 64 and within the edge 16 when the front legs 20 are in a fully collapsed position P2.

Once the front lock bar 46 is translated up the support 50 towards the platform 12, the short end 36 of the front levers 30 are now free from the lock housings 44 of the front locks 40. As the device 10 is pushed towards the bed of the truck, the front legs 20 are pivotally pushed towards the platform 12 as well. The front lever 30 begins to pivot about the long end 34 as the angle between the long end 34 and the front lever 30 may approach, and eventually exceed, zero degrees. Simultaneously, the front supports 50 begin to pivot about the short end 34 of the front lever 30 and pivot about the platform 12 as the angle between the platform 12 and the front supports 50 approach zero degrees. The device 10 may be continually translated onto the bed of the truck as the front pair of legs 20 eventually may be placed in the fully collapsed position P2, where the front supports 50 and front legs 20 may be resting substantially parallel to the underside 13 of the platform 12.

Once the front legs 20 are in the collapsed position P2, the device 10 may be further translated onto the bed of the truck. For example, the rear wheels 57 may be rotating along the ground while the front wheels 56 may be rotating along the bed of the truck. In some embodiments, the platform 12 is comprised of material capable of sliding over the bed of the truck and/or the gate of the truck during translation of the platform 12 onto the truck. In other embodiments, the platform 12 may include an additional pair of wheels engaged with a front-most portion of the platform 12 for aiding the translation. The material of the platform 12 may include a blow-molded plastic material. In some cases, the platform 12 will be not be planar with the truck bed, instead approaching it too high or too low, with adjustments needed by the user to adapt to the bed height. If too low, for example, the bottom of the table would make contact with the bed at the gate edge and sliding along the bottom of the platform 12.

Upon approaching the bed of the truck with the rear legs 22, the rear lock bar 47 may be translated up the rear support bar 51, towards the underside 13 of the platform 12, for placing the rear lock 42 in an unlocked position P4 by translating the lock housing 44 off of the short end 36 of the rear lever 32. The rear lock bar 47 may be translated manually, by grabbing the bar 47 and pulling or pushing the bar 47 up the support 51 towards the platform 12. Alternatively, the front lock bar 46 may be translated by pushing the device 10 towards the bed of the truck such that the truck or truck bed engages the rear lock bar 47, thereby causing the rear lock bar 47 to be pushed up the support 51 towards the platform 12. In yet another embodiment, a rear pull bar or wire may extend from a position near the handle 60 to the rear lock bar 47 and may be pulled, thereby pulling the rear lock bar 47 up the support 51 towards the platform 12. In some embodiments, the rear supports 50 may include a stop member 53 defined on the outer area of the rear support 51 for engaging the rear lock bar 47 during translation up the support 51 and for stopping any further translation up the support 51. By stopping the translation of the rear lock bar 47, the stop member 53 ensures that the rear lock bar 47 is positioned within the edge 16 when the rear legs 22 are in a fully collapsed position P2.

The device 10, platform 12, surface 14 and/or edge 16 may configured with various features to allow for easier transporting of loads 1, notwithstanding the features described herein. One or more hooks 82 may be engaged with, or defined by, the device 10, platform 12, surface 14 and/or edge 16 for accepting bungies or ropes to be selectively fastened thereto for securing the load 1. The bungies and/or ropes may be included as part of the device 10. 13. The device 10, platform 12, surface 14 and/or edge 16 may include at least two straps 84 for securing the load 1 to the device 10. The device 10, platform 12, surface 14 and/or edge 16 may further include at least two slits 86 through which the straps 84 may translate. Hooks 82 or some other fastening mechanism 88 may be positioned opposite the slit 86 for selectively fastening with the strap 84.

The device 10 may include opposing rails 87 selectively engageable or couple to the device 10, platform 12, surface 14 and/or edge 16 for securing the load 1 therebetween. The device 10 may include a rail lock and a rail release for performing the selectively engaging functions. The rails 87 may define any number of slits 86, hooks 82 or other fastening mechanisms 88 for securing the load 1, whether with the aid of rope, bungee, straps 84 or some other securing mechanism. The rails 87 may include or define hooks 82. The rails 87 and/or the edges 16 may be rotationally translatable with respect to the device 10, platform 12 and/or surface 14. For example, but not limited thereto, the rails 87 and/or edges 16 may be coupled to the device 10, platform 12, and/or surface 14 and be rotated from a resting position alongside the borders of the surface 14 to a securing position above the surface 14.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A device for moving a load comprising:
   a platform defining a surface and an edge extending downward therefrom; and
   a pair of opposing front legs and a pair of opposing back legs, each leg defining a top portion pivotally engaged with the platform interior of the edge,
   wherein each pair of legs has an extended position where each leg extends away from the edge, and
   wherein each pair of legs has a collapsed position where:
      the top portion of each leg extends substantially parallel and interior to the edge;
      a middle portion of each leg extends through a corresponding slot defined by the edge; and
      a bottom portion of each leg extends substantially parallel and exterior to the edge.

2. The device of claim 1, further comprising:
   a lever corresponding to each leg, the lever defining:
      a long end pivotally engaged to the top portion of the leg; and
      a short end pivotally engaged to a support corresponding to each of the legs; and
   the supports pivotally engaged to the platform interior of the edge.

3. The device of claim 2, further comprising a lock corresponding to each pair of legs, the locks defining:
   two lock housings slidingly coupled with each of two of the supports; and
   a lock bar extending between the two lock housings,
   wherein each of the two lock housings are configured to receive the short end of the lever when the pair of legs is in the extended position for locking the lever into a locked position.

4. The device of claim 1, further comprising a bridge extending between the bottom portions of each of the pair of legs.

5. The device of claim 4, wherein the edge further defines a pair of grooves for accepting the bridge when the pair of legs is in the collapsed position.

6. The device of claim 1, further comprising a wheel engaged to a bottom portion of each of the legs for translating the device when the pair of legs is in the collapsed or the extended position.

7. The device of claim 6, wherein each wheel is engaged with a shock for translating the device over uneven surfaces.

8. The device of claim 1, further comprising a handle engaged with the platform for maneuvering the device.

9. The device of claim 8, wherein the handle includes an electrical port for providing electricity or transferring data.

10. The device of claim 9, wherein the handle further includes a surge protector engaged with the electrical port.

11. The device of claim 1, further comprising a removable panel engaged with the surface of the platform.

12. The device of claim 11, further comprising a storage cavity defining an open side coverable by the removable panel.

13. The device of claim 1, further comprising at least two straps for securing the load to the device.

14. The device of claim 1, wherein the edge and/or the surface defines at least two pairs of opposing slits through which the straps may translate.

15. The device of claim 1, further comprising a pair of wheels engaged with the platform for translating the platform over a ground.

16. A method for moving a load from a first location, comprising:
provyding a device having a platform defining a surface and an edge extending downward therefrom, wherein the device includes a pair of opposing front legs and a pair of opposing back legs, each leg defining a top portion pivotally engaged with the platform interior of the edge, wherein each pair of legs has an extended position where each leg extends away from the edge, and wherein each pair of legs has a collapsed position where: the top portion of each leg extends substantially parallel and interior to the edge, a middle portion of each leg extends through a corresponding slot defined by the edge, and a bottom portion of each leg extends substantially parallel and exterior to the edge;
translating the device from the first position and engaging a lock bar of the device for unlocking the front legs;
further translating the device and pivoting the front legs toward the collapsed position.

17. A device for moving a load comprising:
a platform defining a surface and an edge extending downward therefrom; and
a pair of opposing front legs and a pair of opposing back legs, each leg defining a top portion pivotally engaged with the platform interior of the edge,
wherein each pair of legs has an extended position where each leg extends away from the edge, and
wherein each pair of legs has a collapsed position where:
the top portion of each leg extends substantially parallel and interior to the edge;
a middle portion of each leg extends through a corresponding slot defined by the edge; and
a bottom portion of each leg extends substantially parallel and exterior to the edge;
a lock bar positioned between the pair of front legs for unlocking the front legs when in the extended position and permitting pivoting of the front legs.

18. The device of claim 17, further comprising two lock housings slidingly coupled with the lock bar and supports engaged with the pair of front legs.

19. The device of claim 17, wherein each of the two lock housings are configured to receive a short end of a lever when the pair of front legs are in the extended position for locking the lever into a locked position.

* * * * *